United States Patent [19]

Hirama et al.

[11] Patent Number: 4,606,577
[45] Date of Patent: Aug. 19, 1986

[54] AUTOMOTIVE FOLDING SEAT

[75] Inventors: Yasuo Hirama, Chigasaki; Yoshihiro Umetsu, Zama, both of Japan

[73] Assignees: Nissan Motor Company, Ltd., Yokohama; Nissan Shatai Company, Ltd., Hiratsuka, both of Japan

[21] Appl. No.: 525,502

[22] Filed: Aug. 22, 1983

[30] Foreign Application Priority Data

Aug. 23, 1982 [JP] Japan ............................... 57-144818
Aug. 23, 1982 [JP] Japan ............................... 57-145879
Aug. 23, 1982 [JP] Japan ............................... 57-145881

[51] Int. Cl.4 .......................... B60N 1/04; B60N 1/10
[52] U.S. Cl. .................................... 297/331; 297/336; 297/379
[58] Field of Search ....... 292/122, 124, 340, DIG. 14, 292/DIG. 41; 297/331, 334, 335, 336, 378, 379

[56] References Cited

U.S. PATENT DOCUMENTS

| 2,709,612 | 5/1955 | Fox | 292/DIG. 41 X |
|---|---|---|---|
| 2,758,864 | 8/1956 | Dixon | 292/DIG. 41 X |
| 2,814,193 | 11/1957 | Roethel | 292/DIG. 41 X |
| 2,917,916 | 12/1959 | Dall | 292/124 X |
| 3,027,184 | 3/1962 | De Vito | 292/DIG. 41 |
| 3,709,537 | 1/1973 | Kazaoka et al. | 292/DIG. 41 X |
| 3,880,464 | 4/1975 | Murphy et al. | 297/379 X |
| 3,966,242 | 6/1976 | Vitalis | 292/DIG. 14 X |
| 4,067,611 | 1/1978 | Kurozu et al. | 297/379 X |
| 4,279,442 | 7/1981 | Bell | 291/379 X |
| 4,444,431 | 4/1984 | Suzuki | 297/379 X |

FOREIGN PATENT DOCUMENTS

| 47699 | 3/1982 | European Pat. Off. | 297/378 |
|---|---|---|---|
| 2306102 | 10/1976 | France | 297/379 |
| 164532 | 12/1980 | Japan | 297/344 |
| 90735 | 7/1981 | Japan | 297/331 |
| 467207 | 6/1937 | United Kingdom | 292/122 |
| 2065761 | 7/1981 | United Kingdom | 297/331 |

Primary Examiner—William E. Lyddane
Assistant Examiner—Peter R. Brown
Attorney, Agent, or Firm—Schwartz, Jeffery, Schwaab, Mack, Blumenthal & Evans

[57] ABSTRACT

An automotive folding seat is adapted to be retracted to provide a wider entrance space for passengers. The seat back can be folded onto a seat cushion and the seat in its entirety can be pivoted to a retracted position wherein the seat cushion is aligned vertically with the seat back folded onto the seat cushion. A locking mechanism serves to hold the seat cushion in its normal operating position. The locking mechanism is engageable to a striker rigidly mounted on the vehicle body and associated with a hinge mechanism which latches the seat back in its normal operating position and allows pivotal movement to the folded position in response to release operation of an operation lever. The operation lever also causes the locking mechanism to release its locking engagement with the striker to allow retracting movement of the seat cushion. The locking mechanism and the striker are adapted to ensure mutual locking engagement by restricting their relative displacement to even when a significant bending stress is applied to the seat.

9 Claims, 24 Drawing Figures

AUTOMOTIVE FOLDING SEAT

BACKGROUND OF THE INVENTION

The present invention relates generally to a folding seat for an automotive vehicle. More specifically the invention relates to a locking mechanism of an automotive folding seat which has a seat back capable of being pivoted onto a seat cushion and which is itself pivotally movable to a position in which the seat cushion is aligned vertically while the seat back is folded onto the seat cushion, and which locking mechanism can latch the seat back and seat cushion in their normal operating positions.

In passenger vehicles, there are various seat constructions allowing rear seat occupants to easily get in and out of the rear seat space in the vehicle compartment. Some vehicle seats are accordingly provided with a reclining mechanism which allows the seat back to incline forwards in order to provide a wider entrance or exit space for the rear seat occupants. In another construction, a so-called "walk-in" system for moving the front seat frontwardly along a seat slide mechanism is provided for the front seat.

The invention is to provide a vehicle seat structure which allows easier ingress and egress to the rear seat in comparison with the conventional equivalent systems. To provide a wider entrance space, the folding seat according to the present invention has a seat back which can be fully folded onto the seat cushion and a seat cushion which can be pivoted into a vertical alignment. As a result, space normally occupied by the seat is available for getting into and out of the passenger compartment when first the seat back and then the seat cushion are pivotted out of the way.

The folding seat of this type should have a locking mechanism for latching the seat in its normal operating position wherein the seat can receive the occupant. The locking mechanism must be durable and must provide a reliable locking engagement even when significant bending stresses capable of deforming the seat frame are applied to the folding seat.

SUMMARY OF THE INVENTION

Therefore, it is a principle object of the present invention to provide a foldable seat for an automotive vehicle, particularly for a passenger vehicle, which has a seat back capable of being folded onto a seat cushion and the seat as an assembly of the seat back and the seat cushion can be pivotally moved into a vertical alignment in order to provide a wider walk-in space for the rear seat occupants.

Another and more specific object of the present invention is to provide a folding seat with a locking mechanism which can durably and reliably latch the seat assembly in its normal operating position for receiving occupants.

A further object of the present invention is to provide a folding seat which has a built-in safety belt for restraining seat occupants when accidents occur.

To accomplish the above-mentioned and other objects, a folding seat, according to the present invention, has a locking mechanism comprising a latch mounted on a seat cushion and a striker rigidly mounted on a vehicle body and engageable with the latch. The striker is provided with a means for retaining engagement between the latch and the striker until the locking engagement is manually canceled.

The folding seat of the present invention further includes a pivot means for pivotal movement of the seat assembly for moving the seat assembly to the walk-in position wherein the seat back is folded onto the seat cushion which in turn is aligned vertically. In the preferred construction, the pivot means is associated with the front legs of a seat cushion frame, so that the space normally occupied by the seat cushion can be utilized as a walk-in space.

In one aspect of the present invention, a folding seat for an automotive vehicle comprises a seat assembly having a seat cushion and a seat back pivotably secured to the seat cushion, a hinge mechanism provided between the seat cushion and the seat back for pivotal movement of the seat back with respect to said seat cushion, a pivot means provided for the seat cushion for pivotal movement of the latter between an essentially horizontal position and a retracted position wherein the seat cushion is aligned essentially vertically, a locking mechanism engageable to a striker rigidly secured to a vehicle body for locking the seat cushion in said horizontal position, and the striker including means for retaining locking engagement between the lock mechanism and the striker until the locking engagement is manually canceled.

According to another aspect, an automotive folding seat comprises a seat back, a seat cushion, a first pivot connecting the seat back to the seat cushion and allowing the seat back to pivot between a first position essentially perpendicular to the seat cushion and a second position essentially parallel thereto, a second pivot connecting the seat cushion to the floor of an automotive passenger compartment and allowing the seat cushion to pivot between a third position essentially parallel to the floor and a fourth position essentially perpendicular thereto, a manual latch for retaining the seat back in the first position, the manual latch being manually operable by the automotive passengers, and an automatic latch for retaining the seat cushion in the third position, the automatic latch being automatically engaged when the seat cushion is moved from the fourth to the third position and automatically disengaged when the seat back is moved from the first to the second position.

BRIEF DESCRIPTION OF THE DRAWINGS

The present invention will be more fully understood from the detailed description given herebelow and from the accompanying drawings of the preferred embodiments of the invention, which, however, should not be taken as limiting the invention but are for illustration and explanation only.

In the drawings.

DESCRIPTION OF THE PREFERRED EMBODIMENTS

Figure 1:
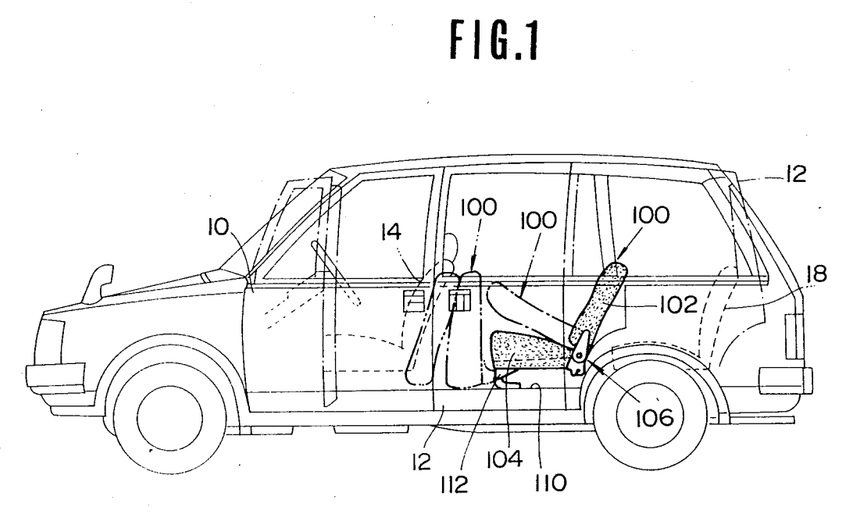
FIG. 1 is a side elevation of an automotive vehicle in which the preferred embodiment of a folding seat according to the present invention is facilitated.
Figure 2:
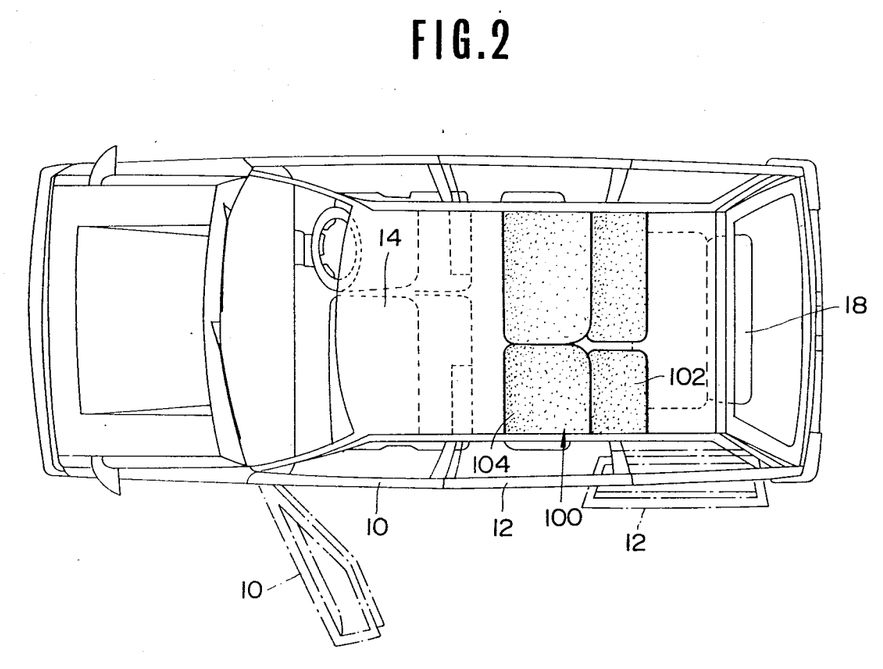
FIG. 2 is a plan view through the roof of the vehicle of FIG. 1.

Referring now to the drawings, particularly to FIGS. 1 and 2, an automotive vehicle as illustrated has a body having a single integral door opening on each side. The front half of the door opening is closed by a front swinging door 10 and the rear half is closed by a rear sliding door 12. Front, second and rear seats 14, 100 and 18 are mounted in the vehicle compartment. The second seat 100 comprises a folding seat which has a seat back 102 connected to a seat cushion 104 by means of a hinge mechanism 106. A front leg 108 of the seat 100 is pivotably secured to the vehicle floor 110 for pivotal movement about a pivot 112. The seat back 102 can be pivoted about the hinge mechanism 106 onto the seat cushion 104. Thus, when the seat back 102 is folded onto the seat cushion 104, the seat 100 itself can be pivotally moved such that the seat back and seat cushion are aligned vertically, which position is hereafter referred to as the retracted position. The position in which the seat back is folded onto the seat cushion while the seat 100 itself remains in place is referred to as the folded position. Finally, the condition of the seat wherein the seat back is unfolded and thus aligned vertically and the seat cushion is aligned horizontally so that passengers may occupy the seat 100 will be referred to hereinafter as the normal position.

It should be appreciated that although a specific type of vehicle has been disclosed and illustrated in order to show a specific embodiment of the invention, the folding seat of the present invention is applicable to any sort of vehicle.

Figure 3:
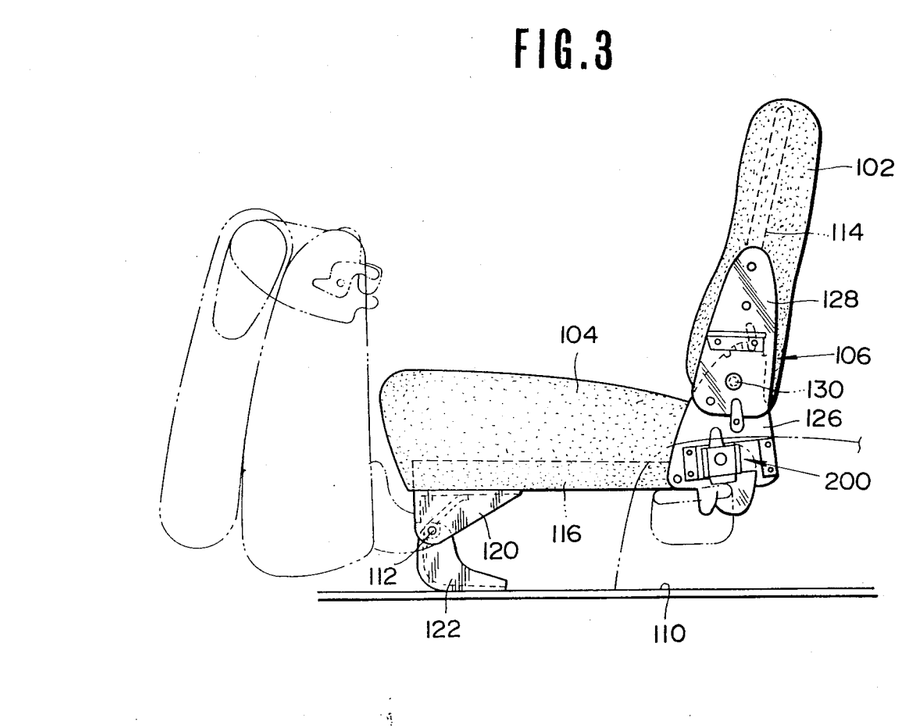
FIG. 3 is a side elevation of the preferred embodiment of the folding seat.
Figure 4:
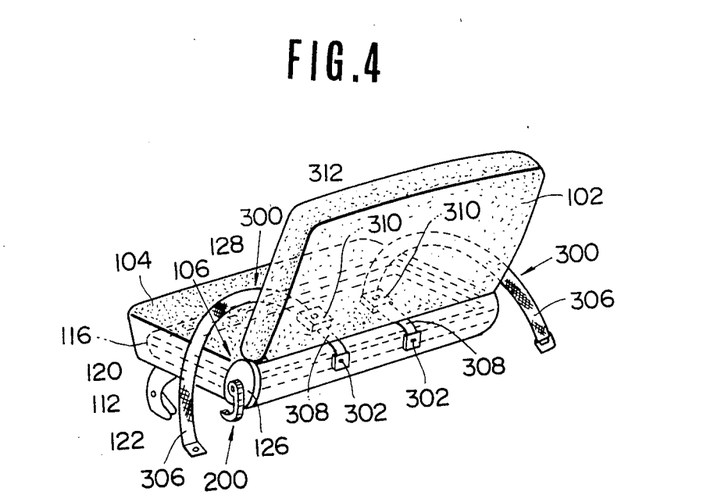
FIG. 4 is a perspective view of the folding seat of FIG. 3.

As shown in FIGS. 3 and 4, the folding seat 100 serving as the second seat of the vehicle of FIGS. 1 and 2 comprises the seat back 102 and the seat cushion 104 hinged to the seat back at its rear end. The seat back includes a seat back frame 114 of generally U-shaped configuration. Likewise, the seat cushion has a seat cushion frame 116 supporting a cushion member 118. The seat cushion frame 116 has a front leg 120 extending from its front edge. The front leg 120 is pivotably connected to a bracket 122 for pivot movement about a pivot 112, as shown by phantom line in FIG. 3.

Figure 5:
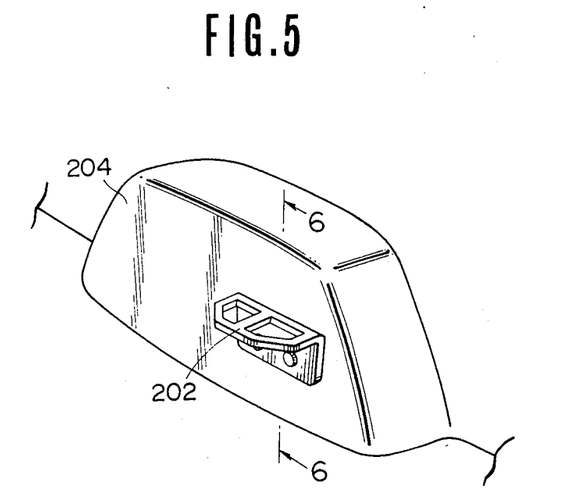
FIG. 5 is a perspective illustration of a vehicle body around a rear wheel house on which a striker of a locking mechanism in the preferred embodiment of the folding seat is mounted.
Figure 6:
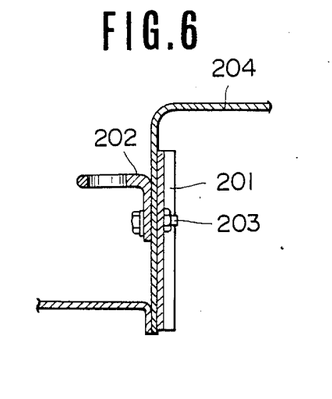
FIG. 6 is a section taken along line 6—6 of FIG. 3.

The hinge mechanism 106 generally comprises a base member 126 rigidly secured to the rear edge of the seat cushion frame 116 and a hinge arm member 128 rigidly secured to the seat back frame 114. The top portion of the base member 126 is pivotably connected to the lower end of the hinge arm member 128 by means of a pivot 130 to allow folding movement of the seat back 102 about a horizontal axis. The hinge mechanism 106 is associated with a locking mechanism 200 for locking the seat 100 in its normal position. The locking mechanism 200 is engageable with a striker 202 rigidly secured to the inner surface of a wheelhouse 204 of the vehicle body, as shown in FIGS. 5 and 6, at a point corresponding to the position of the lock mechanism when the seat is in its normal position. In the preferred construction a reinforcement member 201 and the striker 202 are secured together on opposite sides of the wheelhouse 204 by means of a conventional bolt 203, the reinforcement member 201 being on the outside, hidden surface of wheelhouse 204.

An anchor 302 of a safety belt assembly 300 is rigidly secured to the rear lateral arm of the seat cushion frame 116, as shown in FIG. 4. Each safety belt 300 comprises two lengths of belt 306 and 308. One end of the belt 308 is connected to the anchor 302. The other end of the belt 308 has a buckle 310. The end of the belt 306 opposing the safety belt buckle 310 has a connecting tongue 312 engageable with the buckle. The other end of the belt 306 is secured to the vehicle body. Preferably, the end of the belt 306 is associated with a safety belt retractor (not shown) secured to the rear wheelhouse 204.

Figure 7:
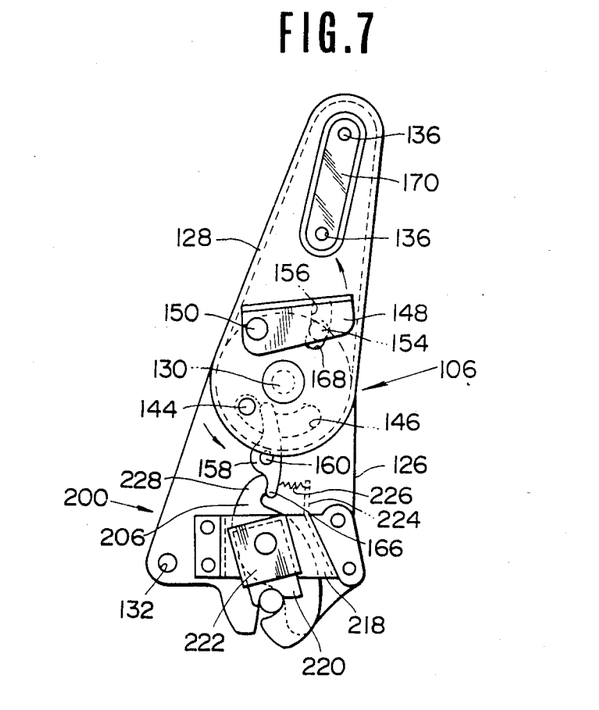
FIG. 7 is an enlarged side elevation of a locking mechanism of the folding seat of FIG. 3.
Figure 8:
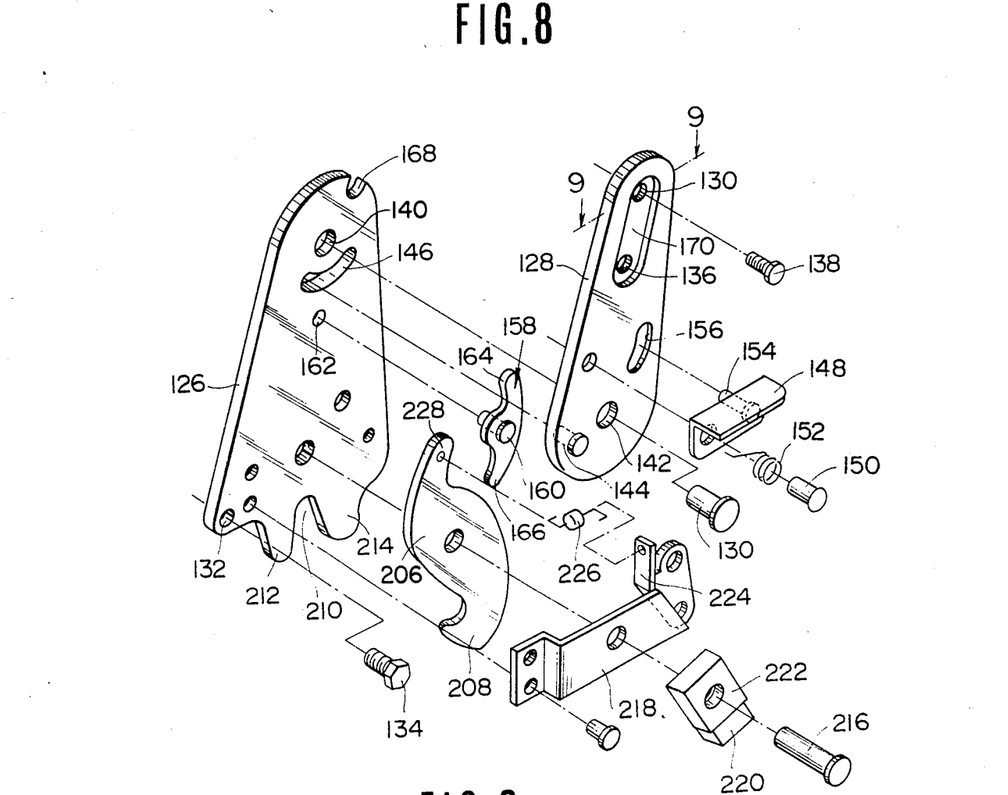
FIG. 8 is an exploded view of the locking mechanism of FIG. 7.

FIGS. 7 and 8 shows the detailed structure of the locking mechanism 200 and the hinge mechanism 106. The base member 126 is formed with openings 132 through which fastener bolts 134 engage the seat cushion frame 116. The hinge arm member 128 is also formed with openings 136 through which fastener bolts 138 engage the seat back frame 114 for rigidly securing the hinge arm member 128 to the seat back. As set forth previously, the base member 126 and the hinge arm member 128 are connected in a pivotal relationship for pivotal movement about the pivot 130 which passes through aligned openings 140 and 142 respectively formed in the base member and the hinge arm member. A guide pin 144 protrudes from the hinge arm member 128 to loosely engage an elongated arcuate opening 146 in the base member 126 in order to limit the range of pivotal movement of the hinge arm member in relation to the base member. The hinge arm member 128 also supports an operation lever 148 via a pivot pin 150. A torsion spring 152 is wound around the pivot pin 150 to bias the operation lever 148 in the clockwise direction as seen in FIG. 7. A guide pin 154 protrudes from the operation lever 148 and engages an elongated arc-shaped opening 156 formed in the hinge arm member 128.

A link member 158 is attached to the base member 126 via a pivot pin 160 engaging an opening 162 formed in the base member. The link member 158 has an upper end portion 164 which can contact the guide pin 144. The lower end portion 166 of the link member 158 contacts the upper end of a latch member 206 of the locking mechanism 200. The latch member 206 has a hook 208 at its lower end for engagement with the striker 202. The hook 208 of the latch 206 opposes a recess 210 defined by a pair of extensions 212 and 214 extending downwardly from the lower edge of the base member 126. The latch 206 is pivotably secured to the base member 126 by a pivot pin 216. A bracket 218 and a rubber bumper 220 within another bracket 222 are also secured to the latch 206 by the pivot pin 216.

The bumper rubber 220 serves to absorb shock which may occur during engagement of the locking mechanism and the striker. However, the bumper rubber is not necessary for the locking structure. Therefore, the bumper rubber can be removed from the locking mechanism, if desired.

The bracket 218 is provided with a vertical strip 224 extending therefrom. One end of a coil spring 226 engages the vertical strip 224. The other end of the coil spring 226 engages the top portion 228 of the latch 206 for biasing the latter clockwise as seen in FIG. 7.

As most clearly shown in FIG. 7, the guide pin 154 extending from the operation lever 148 can travel along the arc-shaped opening 156 of the hinge arm member 128. The travel of the guide pin 154 allows it to engage a latching recess 168 formed in the top of the base member 126. When the seat is in its normal upright position, the guide pin 154 engages the latching recess 168 of the base member 126 to establish latching engagement between base 126 and arm 128 in order to latch the hinge mechanism at its normal position.

Figure 9:
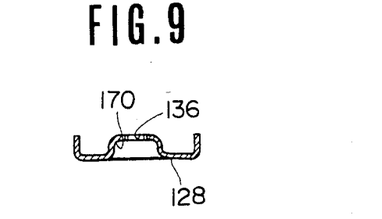
FIG. 9 is a cross-section taken along line 9—9 of FIG. 8.

As shown in FIG. 9, the hinge arm member 128 has flanged edges and a depression 170 around the openings 130, 136 which allows the heads of the fastener bolts 138 to lie flush with the plane surface across which the operation lever 148 pivotally moves.

Figure 10:
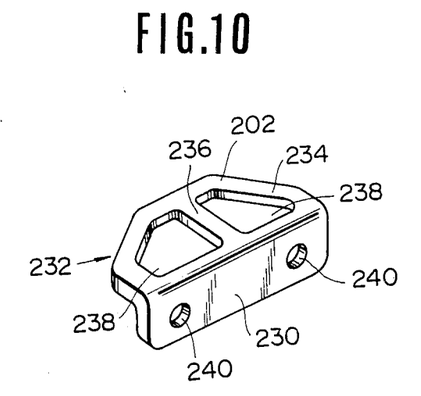
FIG. 10 is a perspective view of the striker in the preferred embodiment of the locking mechanism.

As shown in FIG. 10, the striker 202 is of generally L-shaped configuration in elevation, i.e., it has a base section 230 and a horizontal extension 232 laterally extending perpendicularly from the base section. The horizontal extension 232 comprises essentially U-shaped peripheral legs 234 and a cross-bar segment 236 which extends between the base section 230 and the central portion of the peripheral legs 234 to define a pair of symmetrical openings 238 in the horizontal extension. The base section 230 is formed with openings 240 through which bolts can engage the wheel house 204, as set forth above so that the base section 230 is rigidly secured to the wheel house 204. The horizontal section 232 is located at a position corresponding to the lock mechanism 200 of the folding seat 100 when the folding seat 100 is in its normal position.

Figure 11:
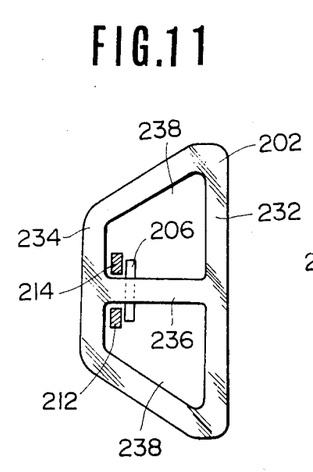
FIG. 11 is a plan view of the striker of FIG. 10 showing the position of the locking mechanism of the folding seat when engaged.

As shown in FIG. 11, the hook 208 of the latch 206 enters into engagement with the cross-bar segment 236 of the horizontal extension 232. The downward extensions 212 and 214 are respectively inserted into corresponding openings 238 to prevent lateral displacement between the cross-bar 236 and the latch 206, thus securing engagement between the striker and the locking mechanism.

Figure 12:
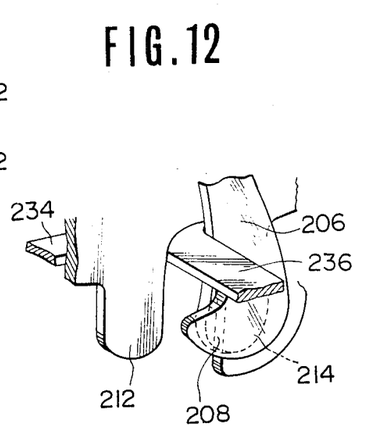
FIG. 12 is a perspective view of the part of a latch in the locking mechanism in co-operation with extensions of a base member.

In the folding seat structure as set forth, the seat back is held in its normal upright position by means of the latching engagement of the guide pin 154 of the operation lever 148 and the latching recess 168 of the base member 126. In this case, the upper end portion 164 of the link member 158 is not in contact with the guide pin 144 of the hinge arm member 128, since, the latch member 206 in contact with the lower end of the former is biased clockwise by the coil spring 226. The latch member 206 engages the striker 202 at the hook 208 as shown in FIGS. 11 and 12. In this position, the extensions 212 and 214 of the base member 126 project into the openings 238 of the striker 202 to restrict lateral displacement between the striker 202 and the latching mechanism 200.

Figure 13:
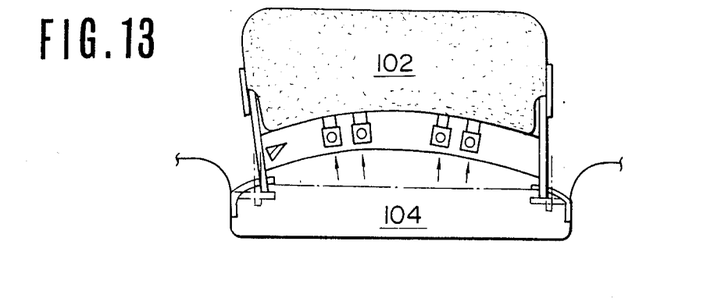
FIG. 13 is an explanatory illustration showing possible deformation of the vehicle seat as a result of bending stresses applied when an accident occurs.

When an accident occurs, such as a collision involving the vehicle, the occupant of the folding seat may be subjected to intense focus due to the inertia of the vehicle's momentum. These forces will be transmitted to the seat frame 116 via the seat belts 300. For example, in a head-on collision, the passenger's momentum will cause him or her to be urged forward against the seat belt. Thus, tension is applied to the safety belt, pulling the anchor rigidly secured to the seat cushion frame upwards and frontwards. As a result, the seat cushion frame is subject to bending stress as represented diagrammatically in FIG. 13. Bending of the seat cushion frame causes the hinge and locking mechanism to be deformed (shown in solid lines in FIG. 13) from its normal configuration (phantom lines). As a result, the striker is subject to forces which pull the peripheral legs 234 forwards and upwards. This movement of the seat cushion and bending movement of the striker is apt to disrupt the locking engagement between the striker and the locking mechanism. This disruption is satisfactorily and successfully prevented by the downward extensions 212 and 214 of the base member, which extensions are co-operative with the latch member to secure locking engagement by restricting lateral displacement between the locking mechanism and the striker with respect to the cross-bar segment of the striker. Thus, according to the shown embodiment, the lock mechanism can hold the cross-bar segment of the striker even if an accident occurs, so that the seat is held in the normal position, successfully preventing the seat from unexpectedly folding.

Figure 14:
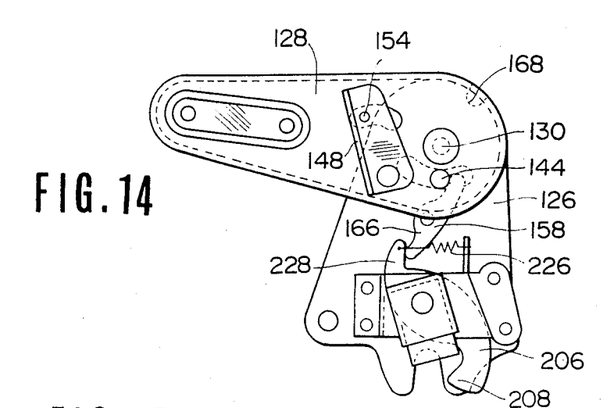
FIG. 14 is a side elevation similar to FIG. 7 but showing the folded position.

To fold the seat, the operation lever 148 is manually pivoted counterclockwise in FIG. 7 to release engagement between the guide pin 154 of the operation lever and the latching recess 168 of the base member 126. Thus, the hinge arm member 128 is freed and becomes rotatable about the pivot 130, as shown in FIG. 14. During counterclockwise movement of the hinge arm member 128, the guide pin 144 of the hinge arm member comes into contact with the upper end portion of the link member 158, causing the latter to pivot clockwise against the biasing force of the coil spring 226. The lower end portion 166 of the link member 158 then pushes the top portion 228 of the latch member 206 to rotate the latter counterclockwise against the spring force. As a result, the hook 208 of the latch member 206 is released from engagement with the cross-bar segment 236 of the striker 202.

Therefore, by releasing the latching engagement between the guide pin 154 and the latching recess 168, the seat back 102 can be folded onto the seat cushion. Simultaneously, the locking engagement of the locking mechanism 200 with the striker 202 is released so that the seat can be moved to the retracted position as shown in FIG. 3 in phantom line.

Figure 15:
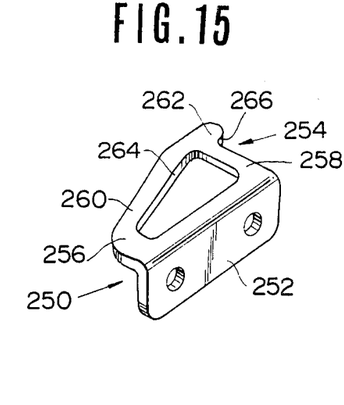
FIG. 15 is a perspective view of a modification of the striker.
Figure 16:
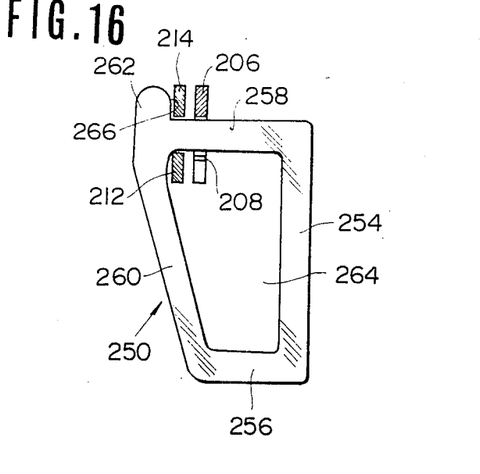
FIG. 16 is a plan view showing engagement of the striker of FIG. 15 and the locking mechanism.

FIGS. 15 and 16 show a modification of the striker in the foregoing first embodiment of the invention. In this modification, the striker 250 comprises a vertically extending base section 252 to be rigidly secured to the wheel house 204 and a horizontal extension 254. The horizontal extension 254 has laterally extending bar segments 256 and 258 horizontally extending from opposite ends of the base section 252 in parallel relationship to each other. A bridging segment 260 extends between the free ends of the bar segments 256 and 258. An extension 262 extends laterally from the bar segment 258 in general alignment with the bridging segment 260. The faces 264 and 266 of the bridging segment 260 and the extension 262 are respectively adapted to mate with the downward extensions 212 and 214 of the base member 126 for restricting relative displacement between the locking mechanism and the striker, as shown in FIG. 16.

Figure 17:
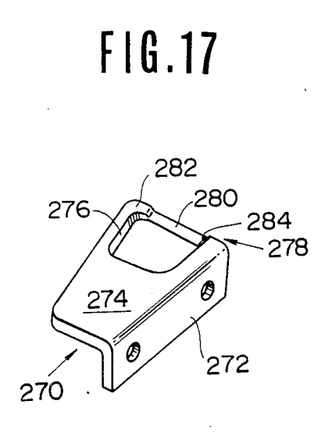
FIG. 17 is a perspective view of another modification of the striker.
Figure 18:
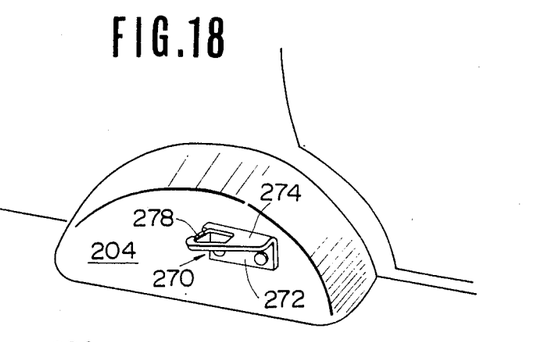
FIG. 18 is a perspective illustration showing one manner of mounting the striker of FIG. 17 onto a wheel house of the vehicle body.

FIGS. 17 and 18 show another modification of the striker in the locking mechanism of the preferred embodiment of folding seat according to the present invention. As in the foregoing modification, the striker 270 has a base section 272 and a horizontal extension 274 horizontally extending from the base section. The width of the horizontal extension 274 tapers down towards the front end thereof. Near its rear end, the horizontal extension 274 is formed with an opening 276. A bar-like section 278 extends along the rear edge of the horizontal extension 274 and has a central portion 280 of circular cross-section and end portions 282 of substantially square cross-section. The central portion 280 is joined to the end portions via steps 284.

As shown in FIG. 18, the base section 272 of the striker 270 is secured to the wheel house 204. The position of the cross-bar section 278 at the rear end of the striker coincides with the position of the locking mechanism 200 of the folding seat when the seat is in its operating position. The locking mechanism 200 is engageable with the striker 270 at the cross-bar section 278 for latching the seat in its normal position.

In this arrangement, due to the tapered edge of the horizontal extension 274, the bending moment applied to the seat cushion frame via the safety belt anchor in the case of accident can be successfully and satisfactorily distributed to the vehicle bodywork, thus preventing the seat and the striker from being deformed. As a result, locking engagement between the locking mechanism of the folding seat and the striker is maintained even when severe bending stresses are applied to the seat cushion frame due to accidents.

Figure 19:
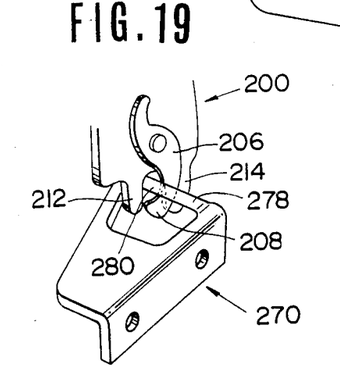
FIG. 19 is a perspective view of the striker of FIG. 17 with which the locking mechanism is engaged.
Figure 20:
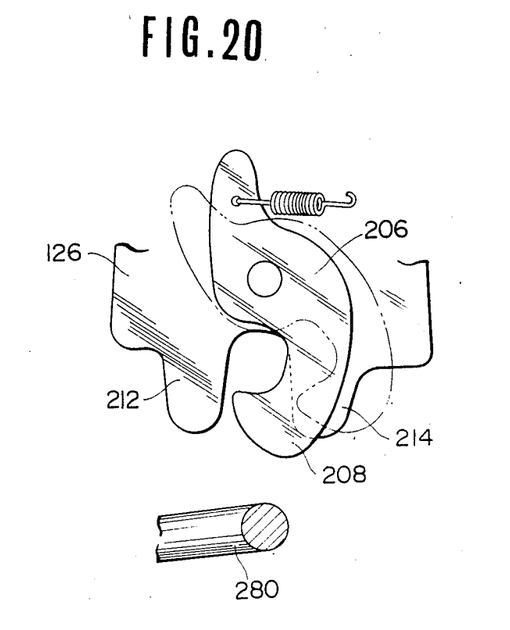
FIG. 20 is an enlarged front elevation illustrating the relationship between the locking mechanism and the striker of FIG. 17.

As shown in FIGS. 19 and 20, the latch member 206 of the locking mechanism 200 engages the cross-bar section 278 by means of the hook 208. The downward extensions 212 and 214 are positioned on opposite sides of the cross-bar section 278 and establish the locking engagement in conjunction with the latch member 206. The hook 208 engages the central portion 280 of the cross-bar section 278 which has a circular cross-section as set forth previously to ensure locking engagement. Due to its circular cross-section, the cross-bar section 278 has no critical points at which the load is concentrated and so effectively distributes the bending stresses along the entire body of the striker and to the vehicle bodywork.

Furthermore by forming the cross-bar section into a circular cross-section, the latch member can rotate thereabout without significant friction therebetween. This increases the durability and service life of the striker.

Figures 21, 22:
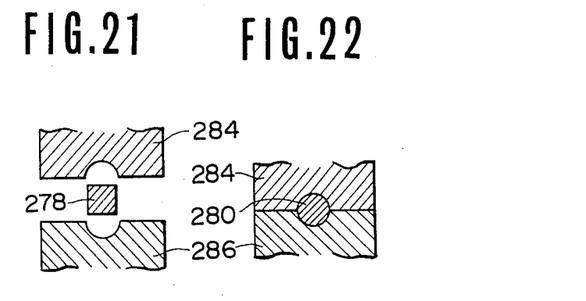
FIGS. 21 and 22 show a process step in the manufacture of the striker of FIG. 17.

FIGS. 21 and 22 show a manufacturing step in which the circular cross-section of the central portion of the striker of FIG. 17 is formed. The striker is generally formed from a metal brank by press-machining. Then, the cross-bar section is pressed into a circular cross-section by means of upper and lower press-dies 284 and 286 in a forging-press.

Figure 23:
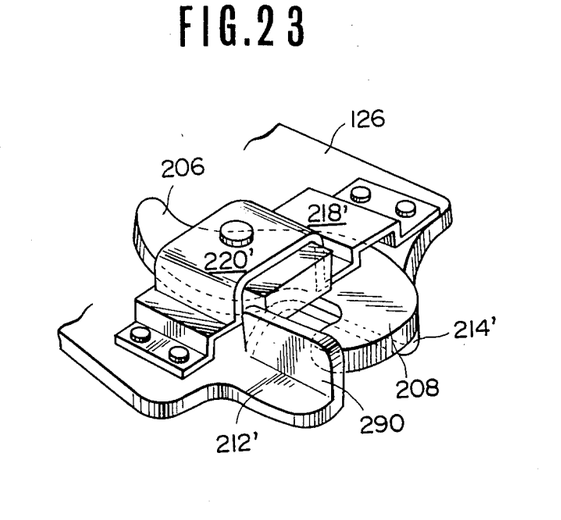
FIG. 23 is a perspective view of a modification of the locking mechanism of the folding seat.

FIG. 23 shows another embodiment of the locking mechanism for the folding seat. In this embodiment, the base member 126 has downwardly protruding extensions 212' and 214'. As in the foregoing embodiment, the latch member 206 with hook 208 is pivotably secured to the base member 126 with the bracket 218' and the bumper-and-bracket assembly 220'. The downward extension 212' has a laterally bent edge 290 opposing the hook 208 of the latch member 206. This bent edge 290 is adapted to resist bending stresses in case of an accident so as to ensure locking engagement between the locking mechanism and the striker.

Figure 24:
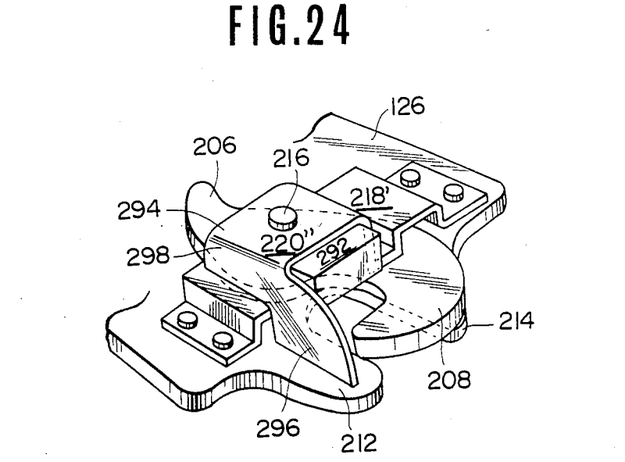
FIG. 24 is a perspective view of another modification of the locking mechanism in the folding seat of the present invention.

FIG. 24 is a further embodiment of the locking mechanism for the folding seat according to the present invention. In this embodiment, the latch member 206 with the hook 208 is pivotably secured to the base member 126 via a pivot pin 216 and a bracket 218'. The bumper-and-bracket assembly 220" is attached to the bracket 218' via the pivot pin 216. The assembly 220" includes the rubber bumper 292 and a bracket 294. The bracket 294 has an extension 296 extending from the vertical wall portion 298 thereof. The extension 296 is rigidly secured to the downward extension 212 of the base member 126. As will be appreciated, this extension 296 acts similarly to the bend edge portion of the downward extension of the foregoing other embodiment. Therefore, according to the shown embodiment, locking engagement between the locking mechanism and the striker is successfully and safely ensured even when an accident occurs.

As set forth, according to the present invention, the folding seat can be held in its normal position by maintaining locking engagement between the locking mechanism and the striker, even when an accident occurs and thus bending stress is applied to the seat frame via the safety belt.

What is claimed is:

1. An automotive folding seat comprising:
   a seat assembly including a seat cushion and a seat back pivotably connected to said seat cushion;
   a hinge mechanism for pivotal movement of said seat back relative to said seat cushion between a first position at which said seat back is positioned essentially vertically and a second position in which said seat back is positioned essentially parallel to said seat cushion;
   a pivot means, provided between the front end section of said seat cushion and a vehicle floor and connecting said front end section of said seat cushion to said vehicle floor, and allowing pivotal movement of said seat cushion relative to said vehicle floor between a third position wherein said seat cushion is positioned essentially parallel to said floor and a fourth position wherein said seat cushion is positioned essentially vertically with respect to said vehicle floor;

a lock mechanism engageable with a striker fixed to the vehicle body and automatically movable into the locking state when said seat cushion moves from said fourth position to said third position and movable into the released state when said seat back is moved from said first position to said second position;

said hinge mechanism having a base member fixedly secured to the rear end of said seat cushion, a hinge arm member fixedly secured to said seat back, a pivot pin pivotably connecting said base member and said hinge arm member, a guide pin extending substantially parallel to said pivot pin, and a guide formed in said base member and engageable to said guide pin, said guide defining the range of motion of said back with respect to said seat cushion;

said hinge mechanism having a manually operable latch means including a latching groove formed in said base member and a latching pin extending from an operation lever pivotably connected to said hinge arm member via said pivot pin and engageable with said latching groove, said latching pin adapted to automatically engage said latching groove when said seat back moves from said second position to said first position for holding said seat back at said first position and responsive to manual operation of said operation lever to release from said latching groove for allowing movement of said seat back from said first position to said second position;

an automatic latch for retaining the seat cushion in the third position, the automatic latch being automatically engaged when the seat cushion is moved from the fourth to the third position and automatically disengaged when the seat back is moved from the first to the second position;

a striker including means for retaining locking engagement between said automatic latch and said striker until the locking engagement is manually canceled, said striker including a first portion engageable with said automatic latch for establishing locking engagement and a second portion formed at least at one end of said first portion and having a greater cross-section than that of said first portion for restricting movement of said automatic latch relative to said first portion; and wherein said lock mechanism has a hook engageable with said striker at its lower end, a latch member connected to said base member, a link member pivotably connected to said base member and having a lower end adapted to contact the upper end of said latch member and an upper end adapted to contact said guide pin, and a bias spring biasing said hook of said latching member for engagement with said striker; and wherein upon actuation of the manually operable latch means, and subsequent pivoting of the seat from its first to its second position, the guide pin bears against the upper end of the link member causing pivotal rotation thereof, the lower end of the link member then bears against the latching member to move it out of engagement with the striker, thereby permitting movement of the seat from its third to its fourth position.

2. The folding seat as set forth in claim 1, further comprising reinforcement means secured onto said vehicle body at a portion corresponding to the portion on which said striker is secured, said reinforcement means secured onto said portion of said vehicle body by means of a common fastener bolt by which said striker is secured onto said vehicle body.

3. The folding seat as set forth in claim 1, wherein said hinge mechanism and said locking mechanism are operated by a common operation lever, said operation lever allowing pivoting of said hinge mechanism to the first released position, said pivoting allowing operation of said locking mechanism to the second released position.

4. The folding seat as set forth in claim 3, wherein said reinforcing means comprises a pair of extensions, extending from said base member of said hinge mechanism, said extensions being engageable to said second portion of said striker to prevent relative displacement of the striker and the hinge mechanism in a direction perpendicular to the extensions.

5. The folding seat as set forth in claim 4, further comprising an elastic damper assembly including a elastic damper and a damper bracket, said damper assembly being adapted to absorb shock resulting from engagement of said locking mechanism and said striker.

6. The folding seat as set forth in claim 5, wherein one of said extensions has a bent portion forming a perpendicular flange along one edge thereof, which bent portion serves to reinforce the locking engagement between said locking mechanism and said striker by restricting relative displacement between said locking mechanism and said striker.

7. The folding seat as set forth in claim 5, wherein said damper bracket has an extension extending along one of said extensions of said base member serving as a reinforcement member for reinforcing said locking engagement between said locking mechanism and said striker by restricting relative displacement between said locking mechanism and said striker.

8. The folding seat as set forth in claim 4, wherein said striker narrows from said first portion in the direction of most-probable application of severe stresses so that stresses will not be concentrated on said first portion.

9. The folding seat as set forth in claim 8, wherein said first portion of said striker has a circular cross-section.

* * * * *